United States Patent
Badulescu et al.

(10) Patent No.: US 10,506,429 B2
(45) Date of Patent: Dec. 10, 2019

(54) SYSTEMS AND METHODS FOR USING GBA FOR SERVICES USED BY MULTIPLE FUNCTIONS ON THE SAME DEVICE

(71) Applicant: TELEFONAKTIEBOLAGET LM ERICSSON (PUBL), Stockholm (SE)

(72) Inventors: Cristina Badulescu, Roxboro (CA); Sorin Surdila, Laval (CA); Ralf Keller, Würselen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/082,764

(22) PCT Filed: Feb. 22, 2017

(86) PCT No.: PCT/IB2017/051017
§ 371 (c)(1),
(2) Date: Sep. 6, 2018

(87) PCT Pub. No.: WO2017/153858
PCT Pub. Date: Sep. 14, 2017

(65) Prior Publication Data
US 2019/0098498 A1      Mar. 28, 2019

Related U.S. Application Data

(60) Provisional application No. 62/305,618, filed on Mar. 9, 2016.

(51) Int. Cl.
H04W 12/04    (2009.01)
H04W 4/50     (2018.01)
(Continued)

(52) U.S. Cl.
CPC ...... *H04W 12/04033* (2019.01); *G06F 21/44* (2013.01); *H04L 41/0806* (2013.01);
(Continued)

(58) Field of Classification Search
CPC ..... H04W 12/06; H04W 12/04; H04W 12/02; H04W 76/10; H04W 12/08; H04W 12/00; H04W 12/10; H04W 76/19; H04L 63/062; H04L 2463/061; H04L 63/20; H04L 67/02; H04L 63/083; H04L 65/1016; H04L 63/0892
See application file for complete search history.

(56) References Cited

U.S. PATENT DOCUMENTS 8,555,345 B2      10/2013   Torvinen et al.
2010/0115598 A1*   5/2010   Barriga ............... H04L 63/0815
                                                              726/8
(Continued)

OTHER PUBLICATIONS

GSMA, Rich Communication Suite 6.0 Advanced Communications, Services and Client Specification, Version 7.0-final draft, Feb. 19, 2016, pp. 1-581.
(Continued)

*Primary Examiner* — Kwasi Karikari

(57) ABSTRACT

This specification presents methods and apparatus in a device and a network node implementing a Bootstrapping Server Function, BSF, for enabling multiple service functions/clients in the device sharing a common public identity and each performing its own registration to one or more (IMS) core network, to use a common bootstrapping of application security based on the Generic Bootstrapping Architecture, GBA/Generic Authentication Architecture, GAA, infrastructure. Therefore, when using Extensible Markup Language, XML, Configuration Access Protocol, XCAP, or the likes, the multiple service functions in the device use the same authentication method for all XCAP traffic or the likes, such as GBA/GAA but enabling it to use the same key sets (e.g., same B-TID).

15 Claims, 10 Drawing Sheets

(51) Int. Cl.
*H04L 29/06* (2006.01)
*H04W 12/06* (2009.01)
*G06F 21/44* (2013.01)
*H04L 12/24* (2006.01)
*H04M 7/00* (2006.01)
*H04W 88/18* (2009.01)

(52) U.S. Cl.
CPC ...... *H04L 65/1016* (2013.01); *H04L 65/1073* (2013.01); *H04M 7/006* (2013.01); *H04W 4/50* (2018.02); *H04W 12/04031* (2019.01); *H04W 12/06* (2013.01); *H04W 12/0609* (2019.01); *H04W 88/18* (2013.01)

(56) References Cited

U.S. PATENT DOCUMENTS

2012/0159602 A1  6/2012  Haynes
2012/0284785 A1* 11/2012  Salkintzis ............... G06F 21/43
                                                              726/7
2015/0056991 A1  2/2015  Seth

OTHER PUBLICATIONS

GSMA, IMS Profile for Converged IP Communications, Version 2.0, Jan. 4, 2016, pp. 1-23.
3GPP TS 33.222 V13.0.0 (Jan. 2016), 3rd Generation Partnership Project; Technical Specification Group Services and System Aspects; Generic Authentication Architecture (GAA); Access to network application functions using Hypertext Transfer Protocol over Transport Layer Security (HTTPS) (Release 13), pp. 1-36.
3GPP TS 33.220 V9.2.0 (Dec. 2009), 3rd Generation Partnership Project; Technical Specification Group Services and System Aspects; Generic Authentication Architecture (GAA); Generic bootstrapping architecture, (Release 9), pp. 1-75.
3GPP TSG SA WG2 Architecture—S2#52, S2-061474, Qualcomm, Use Cases for Multiple Registrations, May 8, 2006, 3 pages.
ISR and Written Opinion from corresponding application PCT/IB2017/051017.

* cited by examiner

| NG.102 Registration | IMS Cores | XCAP Auth method | APs | BSFs | Comments |
|---|---|---|---|---|---|
| Single | 1 | GBA/GAA | 1 AP | 1 BSF | No issue |
| Dual | 1 (same HSS) | VoLTE=GBA/GAA RCS=digest | 1 AP | 1 BSF | No issue. 1 AP serves all XCAP requests, as it determines which auth type it shall do based on the auth parameters received from the client (and if AP supports the requested auth type) |
|  |  | VoLTE & RCS=GBA/GAA | 1 AP | 1 BSF | Whichever client performs the GBA shares the B-TID with the other client, both uses the same B-TID. If B-TID cannot be shared (subject to GSMA WG.102 device implementation): - Each of VoLTE and RCS would have to do their own GBA. Much overhead for little benefit. HSS would keep 2 separate authentication vectors, Avs, per IMPI, while allowing reuse of the same key for both IMPIs. Reusing the same key in multiple Avs is not supported in HSS today. |
| Dual (with same IMPI but 2 IMS cores) | 2 (HSSvolte and HSSrcs) | Both use GBA/GAA | 1 AP | 1 BSF | Device implementation allows to share the B-TID between the VoLTE & RCS clients. Whichever client performs the GBA shares the B-TID with the other client. Both use the same B-TID. |
|  |  |  |  | 1 BSF with 2 FQDN (VoLTE uses 3GPP TS 23.003 derived BSF URI, and RCS must add a new config param. for BSF) | If device implementations do not support sharing B-TID between clients. Use One BSF connected to both HSSvolte or HSSrcs and one AP connected to BSF. (VoLTE client can use 3GPP TS 23.003 for VoLTE FQDN. RCS client uses configured BSF FQDN) |
|  |  | VoLTE=GBA/GAA RCS=digest | 1 AP | 1 BSF for VoLTE (BSF FQDN derived from 3GPP TS 23.003) | No issue For GBA/GAA: the AP goes to BSF only. Only BSF talks to HSSrcs. For digest: the AP goes to HSSrcs. |

FIG. 1

SYSTEMS AND METHODS FOR USING GBA FOR SERVICES USED BY MULTIPLE FUNCTIONS ON THE SAME DEVICE

CROSS REFERENCE RELATED TO APPLICATIONS

This application claims the benefit of priority to previously filed U.S. Provisional Patent Application No. 62/305,618 entitled "SYSTEMS AND METHODS FOR USING GBA FOR SERVICES USED BY MULTIPLE CLIENTS OR FUNCTIONS ON SAME DEVICE USING MULTIPLE IMS REGISTRATIONS WITH ONE OR MORE IMS CORES" and filed on 2016 Mar. 9, the contents of which are incorporated herein by reference

TECHNICAL FIELD

The present disclosure relates to authentication of multiple clients or functions on a device.

BACKGROUND

Existing industry specifications describe how many Internet Protocol (IP) Multimedia Subsystem (IMS) services can coexist on the same device. Group Special Mobile Association, GSMA, Official Document NG.102 describes the native coexistence of Voice over Long Term Evolution (LTE) (VoLTE) and Rich Communication Suite (RCS) functionality in the same device or user equipment, UE, allowing them to use the same public identity (IP Multimedia Public Identity (IMPU)) defined in section 13.4 of Third Generation Partnership Project (3GPP) Technical Specification (TS) 23.003 Release 8 and later, and supporting single and dual IMS registrations.

Several possible configurations for a NG.102 device are allowed:
1) VoLTE and RCS functions use a single IMS registration;
2) VoLTE and RCS use dual IMS registrations with the same IMS core; and
3) VoLTE and RCS use dual IMS registrations with two separate IMS cores.

However, these scenarios are not fully resolved when it comes to the IMS identity model and Extensible Markup Language (XML) Configuration Access Protocol (XCAP) authentication for the XCAP (Ut) traffic from the NG.102 device. XCAP is used by both:
a) a VoLTE client (for access to supplementary services profiles from 3GPP Multimedia Telephony (MMTel) specifications); and
b) an RCS client (e.g., for access to an Open Mobile Alliance (OMA) presence based service when the avatar of a contact needs to be fetched, for management of the resource lists for presence subscriptions and authorization rules for SIMPLE Presence, or for the management of personal network blacklists).

XCAP protocol allows both the VoLTE client and the RCS client to read, write, and modify application configuration data and presence data stored in XML format on a server (e.g., Multimedia telephony server, MMTel). XCAP provides the subscribers with the freedom to self-provision their own services. XCAP uses the HTTP methods PUT, GET, and DELETE to operate on XML documents stored in the servers and is specified in 3GPP TS 24.623, 3GPP TS 33.222 and Internet Engineering Task Force Request for Comment, IETF RFC 4825.

XCAP Authentication:

The XCAP traffic does not go through the session border controller or Proxy Call Session Control function, PCSCF, of the IMS core, but through an Authentication Proxy, AP, instead. The main purpose of the AP is to authenticate user requests to read, write, and modify application configuration data and presence data.

The AP is configured as an HTTP reverse proxy. That means that the Fully Qualified Domain Name, FQDN, of the Application Server, AS, (e.g. MMTel, presence server, (or XML Document Management Server, XDMS) is configured to the AP in such a way that the IP traffic intended to the AS is routed to the AP. The AP performs the authentication of the device or UE. After the authentication procedure has been successfully completed, the AP assumes the typical role of a reverse proxy, i.e. the AP forwards HTTP requests originating from the UE to the correct AS, and returns the corresponding HTTP responses from the AS to the originating UE.

Authentication of XCAP request is based on Generic Bootstrapping Architecture (GBA)/Generic Authentication Architecture (GAA) infrastructure. GBA provides the "bootstrapping of application security" to authenticate the subscriber based on Authentication Key Agreement, AKA, protocol as specified in 3GPP TS 33.102. The GBA/GAA are specified in 3GPP TS 33.220 and 3GPP TS 33.222. To describe existing XCAP authentication, the AP is represented by two functions:
The Network Application Function, NAF:

NAF is the reverse HTTP proxy and handles the security relation with the UE and relieves the AS of this task. Based on Generic Bootstrapping Architecture, GBA, the NAF can assure the AS that the request is coming from an authorized subscriber.

The Bootstrapping Server Function, BSF:

BSF and the UE shall mutually authenticate using the AKA protocol, and agree on session keys (KS_NAF) that are afterwards applied between the UE and the NAF. The BSF shall be able to acquire the GBA user security settings (GUSS) from the Home subscriber server, HSS, in the IMS core. Physically, the NAF and BSF can be different servers. Actually the BSF is in the home network whereas the NAF can be located in a visited network. The above procedure applies for a single IMS registration performed by the UE or the NG. 102 device.

It is however unclear in current industry specifications if a single infrastructure for Generic Bootstrapping Architecture (GBA)/Generic Authentication Architecture (GAA) used for communication services (e.g., for XCAP authentication handling) can be used for the cases when dual IMS registration is used, with either a single IMS core or two IMS cores for a device that uses more than one service function, for example a Voice over Long Term Evolution (LTE) (VoLTE) client/function and a Rich Communication Suite (RCS) client/function. The VoLTE and RCS client/function could be implemented natively within the device or can be implemented as a standalone application downloadable on a device from Application stores hence accessible as a separate application on the user's device.

The existing solution provides the following device configurations that use dual Internet Protocol (IP) Multimedia Subsystem (IMS) registration for the coexistence between VoLTE and RCS clients/functions:

Case 1—Dual registration with one IMS core
The native implementations in the device of a VoLTE client and an RCS client use same or different IP Multimedia Public Identity (IMPU), but in any case, different IP Multimedia Private Identities (IMPIs) when they register towards the same IMS core. When using Extensible Markup Language (XML) Configuration Access Protocol (XCAP), the operator requirements are for these clients and the networks to be able to use the same authentication method for all XCAP traffic, such as Generic Bootstrapping Architecture (GBA)/Generic Authentication Architecture (GAA) using the same key sets (available from the Universal Integrated Circuit Card (UICC) or device).

Case 2—Dual registration with two IMS cores

The native implementations in the device of a VoLTE client and an RCS client can use same or different IMPU/IMPI pairs but register towards two different IMS cores. If using the same IMPU/IMPI, when using XCAP, the requirements are for these clients and the networks to be able to use the same authentication method for all XCAP traffic, such as GBA/GAA using the same key sets (available from the UICC or device).

SUMMARY

There is no solution for the XCAP authentication described for the operator requirements problems described above, when the same IMPU is reused for both VoLTE and RCS using dual IMS registration to one IMS core or two IMS cores. A brief note in section 2.7.1 of GSM Association (GSMA) Official Document NG.102 version 2.0 leaves the handling of the XCAP authentication solution in the scenarios of dual registration out of scope for now:

Note 1: This version of the PRD does not describe whether the XCAP traffic for Multimedia Telephony and the XCAP traffic for SIMPLE Presence and personal network blacklists use the same infrastructure (e.g. aggregation proxy) and authentication when two separate IMS registrations are used for IP Communication Services.

It is therefore an object of the present invention to obviate or mitigate at least one disadvantage of the prior art and to address the above open issue. Note that a tightly integrated RCS and VoLTE function that use a single IMS registration is not an issue. The present disclosure provides a solution for the industry current open issue on handling XCAP authentication used by at least two IMS functions implemented on the same device (e.g., VoLTE and RCS functions), in deployment cases with either a single IMS core or dual IMS cores and where each service function performs its own IMS registration.

NOTE: NG.102 describes that in the dual registration case the RCS registration uses the IMPI and IMPU defined in the IMS management object (as defined in section 2.2 of GSMA RCC.15 Permanent Reference Document, PRD). They can be the same values as for the VoLTE functionality on the device, or can be different. The case when they are different is not of interest in the present disclosure, as the current standard solutions defined today can be applied (as for two different users). Therefore, the embodiments in the present disclosure are based on common IMPU. The IMPI of the VoLTE and RCS functions may however be different when performing dual registration to a common IMS core. The IMPI of the VoLTE and RCS function may however be common when performing dual IMS registration with dual IMS cores.

The underlined text in the summary table of FIG. 1 illustrates the main scenarios that are addressed by the embodiments herein when the device implements a VoLTE function and an RCS function. The main scenarios addressed deal with VoLTE and RCS function using GBA/GAA authentication and perform dual IMS registration to one IMS core or to two IMS cores.

As described herein, in some embodiments, the preferred approach is that the implementation on the device must ensure that only a single set of GBA based shared secret (e.g., Bootstrapping Transaction Identifier (B-TID) and if applicable Network Application Function (NAF) specific key) is used, regardless whether VoLTE and RCS are implemented in the same stack or in a different stack connected via an internal interface or Application Programming Interface, API, in the UE.

In one embodiment, a method of operation of a device, UE, implementing at least two service functions is described. The two service functions may be different IMS functions such as VoLTE and RCS, both sharing a common public identity such as the IMS IP Multimedia Public Identity, IMPU, and both functions can communicate and share information via for example an internal interface. The method comprises the step of obtaining, by the first service function implemented at the device a GBA based shared secret via a GBA bootstrapping procedure. The GBA based shared secret may include the Bootstrapping Transaction Identifier, B-TID and may further include the Network Application Function, NAF, keys. The method additionally comprises the step of sharing the received GBA based shared secret with the second service function implemented at the device. Finally, requesting, by the second service function, authentication via a Generic Authentication Architecture, GAA, procedure based on the GBA based shared secret and the common public identity of the first and second service functions.

In one embodiment, the first and second service functions have different private identities such as for example different IMS IP Multimedia Private Identities, IMPIs (such as when registering to a common IMS core). However, they may also share a common private identity (dual registration to dual IMS core). When registering to IMS, the first and second service functions may register with separate IMS cores or to a single IMS core.

In another embodiment, a method of operation of a device, UE, implementing at least two service functions is disclosed. The two service functions may be two different IMS functions such as VoLTE and RCS sharing a common public identity such as the IMS IMPU. In this method, the two service functions do not communicate internally or do not share any information, which may be the case if the functions are downloaded to the device or are not embedded in the device. The method comprises the step of obtaining, by the first service function implemented at the device, a first Generic Bootstrapping Architecture, GBA, based shared secret, from a Bootstrapping Server Function, BSF, via a GBA bootstrapping procedure using a first Fully Qualified Domain Name, FQDN, served by the BSF for the first service that corresponds to the first service function and the step of obtaining, by the second service function implemented at the device, a second GBA based shared secret from the BSF via the GBA bootstrapping procedure using a second FQDN served by the BSF for a second service that corresponds to the second service function.

The GBA based shared secret may comprise a Bootstrapping Transaction Identifier, B-TID and may include other associated bootstrapping information such as the NAF keys.

Similar to the previous method, the first and second service functions may have different private identities such as for example different IMS IMPIs. However, they may also share a common private identity. When registering to IMS, the first and second service functions may register with separate IMS cores or to a single IMS core.

In some embodiments, the device is adapted to operate according to the method of operation of any one of the embodiments of the device disclosed herein.

According to one embodiment, a method of operation of a network node implementing a Bootstrapping Server Function, BSF, is described. The method comprises the step of receiving a Generic Bootstrapping Architecture, GBA, authentication request message from a first service function implemented at a device, the authentication request message comprises authentication key agreement, AKA, parameters. The BSF proceeds by validating the AKA parameters and may interact with the HSS and provide a Generic Bootstrapping Architecture, GBA, based shared secret, e.g., B-TID and a corresponding lifetime back to the first service function. After authenticating the first service function, the BSF maintains the GBA shared secret, B-TID and the corresponding public identity of the first service function. The BSF then proceeds by authorizing subsequent application request from a second service function implemented at the device, wherein the subsequent application request comprises the GBA based shared secret and a common public identity of the first and the second service functions.

In some embodiments, the network node providing BSF is further operable to operate according to the method of operation of any of the embodiments of the network node disclosed herein.

In one embodiment, a network node providing a Bootstrapping Server Function, BSF, adapted to serve a first Fully Qualified Domain Name, FQDN, for a first service and a second FQDN for a second service is disclosed.

In some embodiment, the network node providing BSF is adapted to provide a first GBA based shared secret (e.g., B-TIDx) to a first service function implemented at a device in response to receiving a bootstrapping request from the first service function directed to the first FQDN served by the BSF. The BSF then proceeds to provide a second GBA based shared secret (e.g., B-TIDx+1) to a second service function implemented at the device in response to receiving a bootstrapping request from the second service function directed to the second FQDN served by the BSF.

Embodiments of a computer program are also disclosed. In some embodiments, a computer program comprises instructions which, when executed on at least one processor, cause the at least one processor to carry out the method of operation of a network node and of a device according to any one of the embodiments disclosed herein. Further, in some embodiments, a carrier containing the aforementioned computer program is provided, wherein the carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

The following acronyms are used throughout this disclosure.

3GPP Third Generation Partnership Project
AAA Authentication, Authorization, and Accounting
AKA Authentication and Key Agreement
AP Application Proxy
AuC Authentication Centre
AUTN Authentication Token
AV Authentication Vector
BSF Bootstrapping Server Function
B-TID Bootstrapping Transaction Identifier
CPU Central Processing Unit
FPGA Field Programmable Gate Array
FQDN Fully Qualified Domain Name
GAA Generic Authentication Architecture
GBA Generic Bootstrapping Architecture
GSMA GSM Association
HSS Home Subscriber Server
IMPI Internet Protocol Multimedia Private Identity
IMPU Internet Protocol Multimedia Public Identity
IMS Internet Protocol Multimedia Subsystem
IP Internet Protocol
ISIM Internet Protocol Multimedia Services Identity Module
LTE Long Term Evolution
MMTel Multimedia Telephony
NAF Network Application Function
OMA Open Mobile Alliance
PRD Permanent Reference Document
RAND Random Challenge
RCS Rich Communication Suite
SIM Subscriber Identity Module
SMS Short Message Service
SQN Sequence Number
TS Technical Specification
UICC Universal Integrated Circuit Card
UNI User Network Interface
URI Uniform Resource Identifier
USIM Universal Subscriber Identity Module
VoLTE Voice over Long Term Evolution
XCAP Extensible Markup Language Configuration Access Protocol
XDMS XML Document Management Server
XML Extensible Markup Language
XRES Expected Response

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1 is a table that summarizes embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 2:
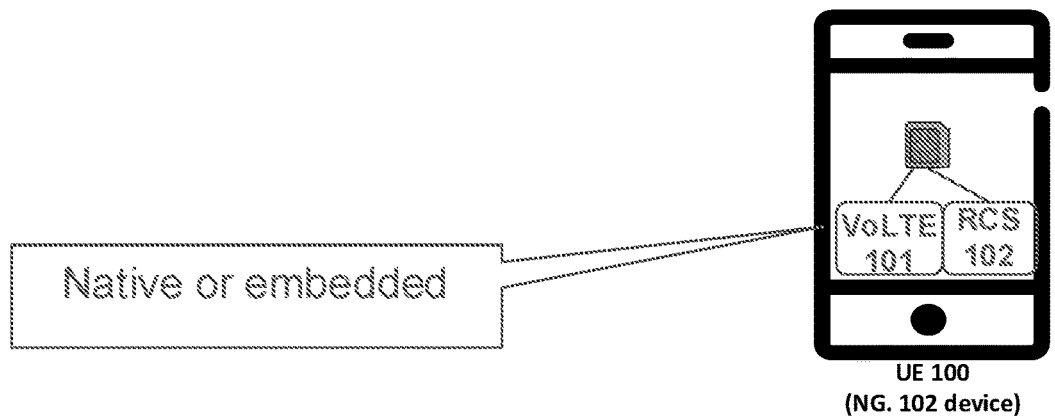
FIG. 2 illustrates a device that implements multiple Internet Protocol (IP) Multimedia Subsystem (IMS) service functions, namely in this example, a Voice over Long Term Evolution (LTE) (VoLTE) function and a Rich Communication Suite (RCS) function according to some embodiments of the present disclosure.

FIG. 2 illustrates a device 100 (e.g., a wireless device such as, e.g., a smart device/phone) according to some embodiments of the present disclosure. Multiple Internet Protocol (IP) Multimedia Subsystem (IMS) service functions are natively implemented/embedded (i.e., can access device credentials and a Universal Integrated Circuit Card (UICC) such as the Universal Subscriber Identity Module (SIM) (USIM)/IP Multimedia Services Identity Module (ISIM) credentials) on the device. In this particular example, the IMS service functions implemented on the device are Voice over Long Term Evolution (LTE) (VoLTE) function 101 and Rich Communication Suite (RCS) function 102. The IMS service functions may be implemented by a single client or, alternatively, by separate clients. The clients may be downloadable from the network.

The present disclosure relates to authentication (particularly Generic Bootstrapping Architecture (GBA)/Generic Authentication Architecture (GAA)) for service functions (e.g., IMS service functions such as, e.g., a VoLTE function and RCS function in this example) using a common public identity (e.g., two IMS service functions using a common public identity in a dual registration scenario). For the remaining discussion, the focus is on IMS service functions; however, again, the concepts disclosed herein are not limited to IMS service functions. With the dual registration scenario, there are two different sub-scenarios, namely, (a) dual registration in one (i.e., the same) IMS core where the VoLTE function 101 uses a first IP Multimedia Private Identity (IMPI) (referred to herein as IMPI1) and the RCS function 102 uses a second IMPI (referred to herein as IMPI2) and (b) dual registration in separate IMS cores where the VoLTE function and the RCS function use the same IP Multimedia Public Identity (IMPU) and IP Multimedia Private Identity (IMPI). Embodiments of a GBA/GAA authentication scheme for the VoLTE and RCS functions in each of these dual registration scenarios are described below.

Figure 3:
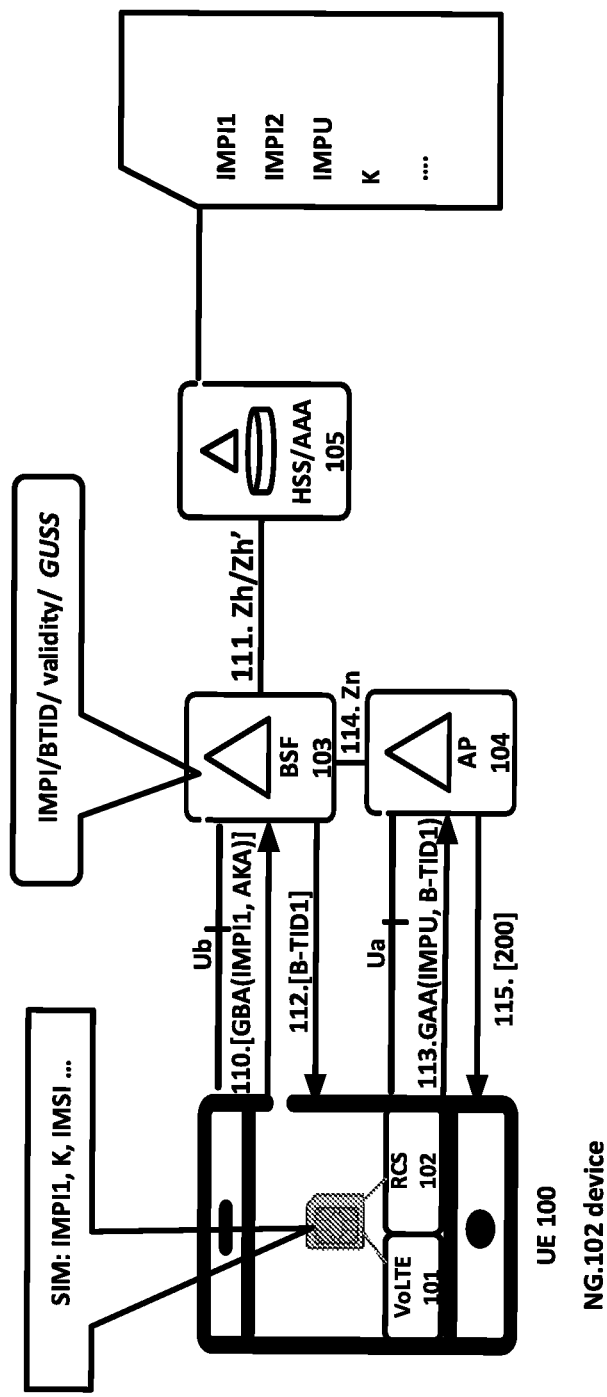
FIG. 3 illustrates the operation of a network and device to enable sharing of GBA based shared secrets, such as a Bootstrapping Transaction Identifier (B-TID), by the multiple IMS functions implemented at the device with multiple IMS registrations in the same IMS core as well as a Generic Authentication Architecture (GAA) authentication of the IMS functions based on the shared B-TID according to some embodiments of the present disclosure.

FIG. 3 illustrates a GBA/GAA authentication scheme using Extensible Markup Language (XML) Configuration Access Protocol (XCAP) for the dual registration scenario in which both the VoLTE function 101 and the RCS function 102 register with the same IMS core using separate IMPIs (i.e., IMPI1 and IMPI2). FIG. 3 illustrates one XCAP authentication process using GBA/GAA as an example; however, the present disclosure is not limited to XCAP. Here, it is assumed that the RCS function 102 can access the SIM credentials of the device 100 (referred to herein as an NG.102 device) and that the same keys (e.g., Ks) can be used by both the VoLTE function 101 and the RCS function 102 on any protocols. The VoLTE function 101 uses SIM IMPI1. The RCS function 102 is configured (e.g., by the network operator) with IMPI2.

In this example, the VoLTE function 101 performs a bootstrapping operation via GBA mechanisms. In particular, the VoLTE function 101 uses at step 110 the Ub interface (i.e., the Third Generation Partnership Project (3GPP) interface for bootstrapping), IMPI1, and the Authentication and Key Agreement (AKA) mechanism as part of the GBA. This goes to a network function referred to as a Bootstrapping Function (BSF) 103. The BSF 103 has an interface to the Home Subscriber Server (HSS)/Authentication, Authorization, and Accounting (AAA) server 105 to validate the information received from the VoLTE function as shown at step 111. Once validated, the BSF 103, at step 112 returns a first GBA based shared secret including the Bootstrapping Transaction ID (B-TID) (referred to herein as B-TID1) back to the VoLTE function 101, and possibly the NAF specific key (not shown in the figure) to be further used by the device 100 in the authentication procedure with the NAF (e.g., for this XCAP example NAF is the Aggregation Proxy 104). This B-TID1 has a defined lifetime (at time over which it is valid). The BSF 103 maintains the B-TID1 and its lifetime and the public identity IMPU associated with the VOLTE function 101. The BSF 103 obtained the public identity from either the UE 100 or the HSS 105.

According to embodiments of the present disclosure, each of the functions at the device 100 (here the VoLTE function 101 and the RCS function 102) that is configured to use GBA/GAA mechanisms share the B-TID obtained by any one of them (whichever one of the functions is performing the bootstrapping procedure on that device), which in this example is the B-TID1 that has just been returned to the VoLTE function 101. Thus, once the VoLTE function 101 receives B-TID1, the VoLTE function 101 and the RCS function 102 then share B-TID1 as long as B-TID1 remains valid. Thus, if the RCS function 102 needs to, e.g., obtain presence information, then, as illustrated, the RCS function communicates at step 113, the B-TID1 along with the IMPU (note that the VoLTE function 101 and the RCS function 102 share the same IMPU) to an Application Proxy (AP) 104 over a Ua interface according to GAA. The AP 104 then validates the B-TID1 (and the IMPU) with the BSF 103 at step 114 over the Zn interface. Since the B-TID1 is valid, the AP 104 then proceeds further with the XCAP flow.

Thus, in the process of FIG. 3, GBA/GAA is applied with the same Authentication Vector (AV) for two different functions or clients on the NG.102 device. The IMPI that is used for the key (K) from the SIM is used to obtain the B-TID. The other function reuses the same B-TID in its own XCAP requests (during B-TID validity). The AP 104 can just validate the B-TID with the BSF 103. Importantly, in the embodiment of FIG. 3, the B-TID is shared between the VoLTE function 101 and the RCS function 102 in the device 100.

Figure 4:
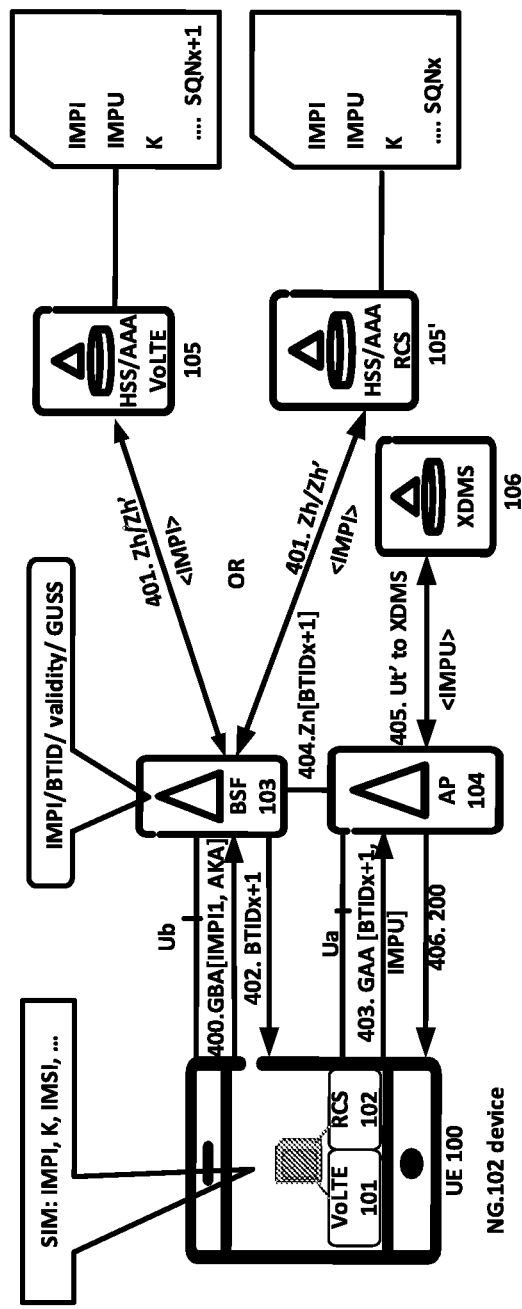
FIG. 4 illustrates the operation of a network and device to enable sharing of a B-TID by the multiple IMS service functions implemented at the device with IMS registration in separate IMS cores as well as GAA authentication of the IMS service functions based on the shared B-TID according to some embodiments of the present disclosure.

FIG. 4 illustrates a GBA/GAA authentication scheme using XCAP for the dual registration scenario in which the VoLTE function 101 and the RCS function 102 register with different IMS cores using one (i.e., the same) IMPI (referred to herein as IMPI1) where the VoLTE function 101 and the RCS function 102 are implemented in such a manner as to allow sharing of the B-TID and GBA key material. FIG. 4 illustrates one XCAP authentication process using GBA/GAA as an example; however, the present disclosure is not limited to XCAP and can be applied on any protocols. Here, it is assumed that the RCS function 102 can access the SIM credentials of the device (referred to herein as an NG.102 device) and that the same keys (Ks, the NAF specific key) can be used by both the VoLTE function 101 and the RCS function 102. Both the VoLTE function 101 and the RCS function 102 use the IMPI and Ks from the SIM, but each of the VoLTE function 101 and the RCS function 102 uses different IMS cores.

In this example, the VoLTE function 101 performs a bootstrapping operation via GBA mechanisms. In particular, the VoLTE function 101 uses the Ub interface with the BSF 103 (i.e., the 3GPP interface for bootstrapping), to perform the AKA mechanism as part of the GBA using IMPI1 at step 400. In contrast to the embodiment of FIG. 3, there are two IMS core networks in FIG. 4. The BSF 103 has an interface to one of the IMS core networks, which is the IMS core that serves the function that performs the bootstrapping on the device, i.e., the VoLTE function 101 in this example. The BSF 103 uses the interface at step 401 to one of the IMS core networks (specifically Zh or Zh' interface to the HSS/AuC 105/105' in one of the IMS core networks) to validate the information received from the VoLTE function 101. Once validated, the BSF 103, at step 402, returns a B-TID (referred to herein as B-TIDx+1) back to the VoLTE function 101. B-TIDx+1 has a defined lifetime (a time over which it is valid).

According to embodiments of the present disclosure, each of the functions at the device (here the VoLTE function 101 and the RCS function 102) that is configured to use GBA/GAA mechanisms shall share the same B-TID, which in this example is B-TIDx+1, which has just been returned to the VoLTE function 101. Thus, once the VoLTE function 101 receives B-TIDx+1, the VoLTE function 101 and the RCS function 102 then share B-TIDx+1 as long as B-TIDx+1 remains valid. Thus, if the RCS function 102 needs to, e.g., obtain presence information, then, as illustrated, the RCS function 102 communicates the B-TIDx+1 along with the IMPU at step 403 (note that the VoLTE function and the RCS function share the same IMPU) to the AP 104 over a Ua interface according to GAA. At step 404, the AP 104 then validates B-TIDx+1 and IMPU with the BSF 103. Since the B-TIDx+1 is valid, the AP 104 then proceeds. When used, the NAF specific key is also shared in this case, although not shown on the figure.

Thus, in the process of FIG. 4, the implementation of the device 100 allows sharing of the GBA key material and B-TID between the VoLTE function 101 and RCS function 102. The BSF 103 can perform the GBA procedure with only one of the two HSSs of the two IMS core networks, since they both relay the same authentication vectors, AV, and computation results for the IMPU/IMPI pair (AV=[RAND, AUTN, XRES, CK, IK], where AUTN is a function taking as input the sequence number, SQN). The computed XRES should be the same for the same RAND, AUTN values. The HSS 105/105' that computed or relayed (when computation takes place in a separate AuC connected to the HSS) the GBA results will increment its SQN in alignment with SQN value on the device 100. In some embodiments, whichever function is the master bootstrapper obtains the GBA based shared secret data such as the B-TID as result of the bootstrapping procedure with the BSF 103. The B-TID is shared between the VoLTE function 101 and the RCS function 102 and is used by both functions during the lifetime of the B-TID. The BSF 103 can then be connected only to the HSS 105/105' of one of the two IMS core networks. Specifically, the BSF 103 can be connected to the HSS of only the IMS core network that corresponds to the function (i.e., the VoLTE function or the RCS function in this example) that is the master bootstrapper. Only one AP 104 is needed, since the AP 104 is communicating with one BSF 103.

At step 405, which may occur in parallel with step 406 or perhaps after step 406, the AP 104 forwards the application request to the presence server XML Document Management Server, XDMS 106, to obtain presence information for the user.

Figure 5:
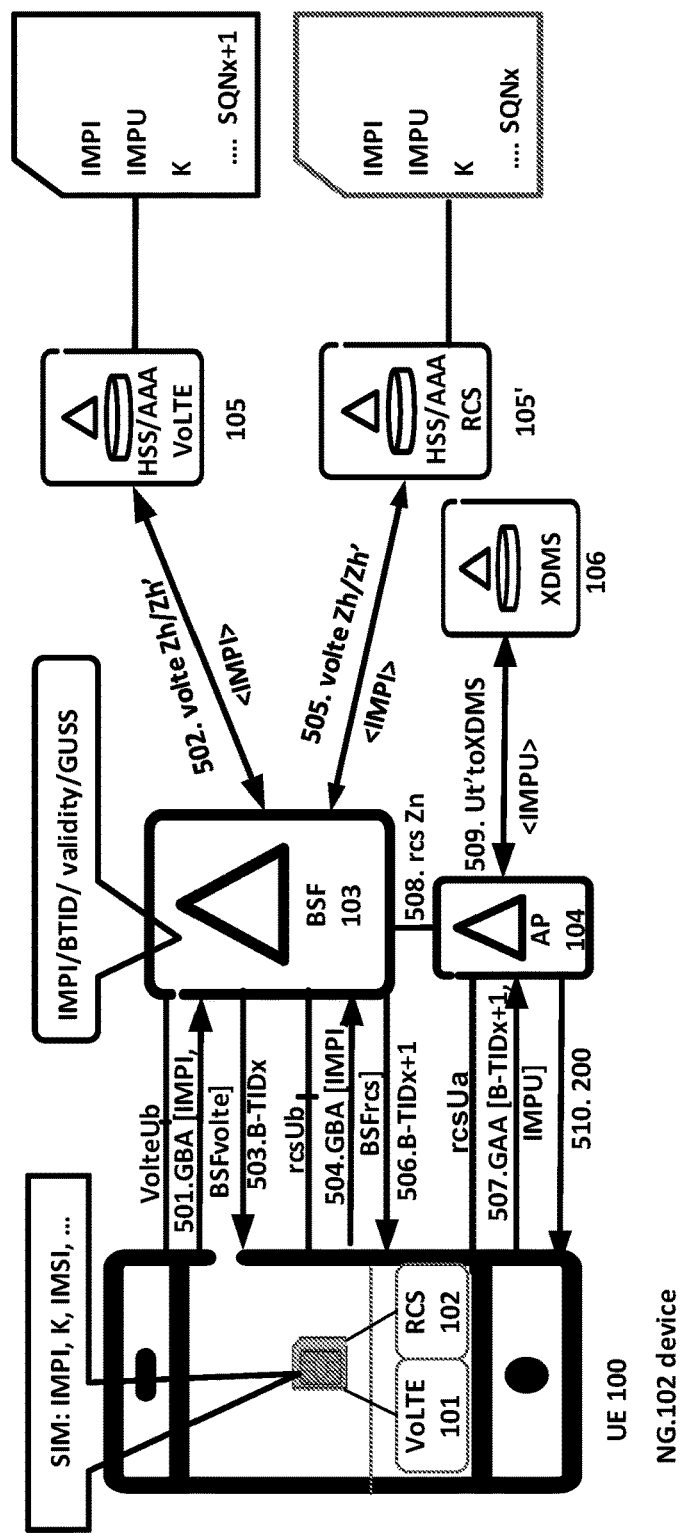
FIG. 5 illustrates the operation of a network and device to enable Generic Bootstrapping Architecture (GBA) bootstrapping of multiple IMS service functions implemented at the device that share a common private identifier with IMS registration in separate IMS cores as well as GAA authentication of the IMS service functions based on the resulting separate B-TIDs according to some embodiments of the present disclosure.

FIG. 5 illustrates a GBA/GAA authentication scheme using XCAP for the dual registration scenario in which the VoLTE function 101 and the RCS function 102 register with different IMS cores using one (i.e., the same) IMPI (referred to herein as IMPI1) where the VoLTE function 101 and the RCS function 102 are implemented in such a manner as to not allow sharing of the B-TID and GBA key material. FIG. 5 illustrates one XCAP authentication process using GBA/GAA as an example; however, the present disclosure is not limited to XCAP. Here, it is assumed that the RCS function 102 can access the credentials (note that while the figures are centered on the UICC based credentials (key), the credentials may be either the UICC credentials or device based credentials) of the device (referred to herein as an NG.102 device 100) and that the same keys (e.g., Ks) can be used by both the VoLTE function 101 and the RCS function 102. Both the VoLTE function 101 and the RCS function 102 use the IMPI and keys from the SIM, but each of the VoLTE function 101 and the RCS function 102 uses a separate IMS core. Further, the VoLTE function 101 and the RCS function 102 are implemented in such a manner that sharing of the B-TID and GBA key material is not allowed.

In this embodiment, the BSF 103 must serve different Fully Qualified Domain Names (FQDNs), one per each function that uses its own IMS Core. In this example there is one BSF FQDN for VoLTE and one for RCS. The different FQDNs allow the BSF 103 to determine to which IMS Core (HSS 105/105') to connect in order to handle a bootstrapping request received from any one of the functions. In some embodiments, the VoLTE FQDN uses the FQDN for the BSF 103 derived according to 3GPP Technical Specification (TS) 23.003, whereas the RCS FQDN is configured (e.g., by the network operator).

In this example, the VoLTE function 101, at step 501, performs a bootstrapping operation via GBA mechanisms using the VoLTE FQDN. In particular, the VoLTE function 101 uses a Ub interface for VoLTE (i.e., the interface with the BSF 103 using the VoLTE FQDN), which is referred to herein as the VoLTE Ub interface, IMPI, and the AKA mechanism as part of the GBA. This goes to the BSF 103. In contrast to the embodiment of FIG. 3, here, there are two IMS core networks, one for VoLTE and one for RCS. The BSF 103 has an interface to the HSS/AAA 105 of the VoLTE IMS core network. The BSF 103 receives the VoLTE bootstrapping request on the IP address and port to which the VoLTE FQDN for BSF 103 is mapped to (via translation in the network's DNS server), and so it determines that it must use the interface towards the HSS/AAA 105 in the VoLTE IMS core network to validate the information received from the VoLTE function, as shown at step 502. Note that this is done in several sets of request-responses per 3GPP TS 33.220. In particular, the BSF 103 receives the IMPI and GBA-bootstrapping request and asks the HSS 105 for AKA procedure. The HSS/AuC 105 generates the RAND (random sequence) and provides the Authentication Vector (AV=RAND∥AUTN∥XRES∥CK∥IK) that is further used by the network to compute the expected result (XRES) and by the device 100 to authenticate the network and to use them as input, together with the local Ks and SQN on the device, to compute the RES (result). Ultimately the BSF 103 compares the RES with XRES. Once validated, the BSF 103 returns at step 503 a B-TID (referred to herein as B-TIDx) back to the VoLTE function 101. B-TIDx has a defined lifetime (a time over which it is valid).

Since, in this embodiment, the VoLTE function 101 and the RCS function 102 do not share the B-TID, the RCS function 102 also performs at step 504 a bootstrapping operation via GBA mechanisms using the RCS FQDN. In particular, the RCS function 102 uses a Ub interface for RCS (i.e., the interface with the BSF 103 using the RCS FQDN), which is referred to herein as the RCS Ub interface, IMPI, and the AKA mechanism as part of the GBA. This goes to the BSF 103 using the RCS FQDN for BSF. In contrast to the embodiment of FIG. 3, here, there are two IMS core networks, one for VoLTE and one for RCS. The BSF 103 has an interface to the HSS/AAA 105' of the RCS IMS core network. Similar to the VoLTE function case, the BSF 103 receives the RCS bootstrapping request on the IP address and port to which the RCS FQDN for BSF is mapped to (via translation in the network's DNS server), and so it determines that it must use the interface to the HSS/AAA 105' in the RCS IMS core network to validate the information received from the RCS function as shown at step 505. Once validated, the BSF 103 returns at step 506 a B-TID (referred to herein as B-TIDx+1) back to the RCS function 102. B-TIDx+1 has a defined lifetime (a time over which it is valid).

As an example, if the RCS function 102 needs to, e.g., obtain presence information, then, as illustrated, at step 507, the RCS function 102 communicates the B-TIDx+1 obtained by the RCS function via the GBA procedure discussed above along with the IMPU (note that the VoLTE function and the RCS share the same IMPU) to the AP 104 over a Ua interface according to GAA. The AP 104 then validates B-TIDx+1 and the IMPU with the BSF 103 at step 508. Since the B-TIDx+1 is valid, the AP 104 then proceeds with forwarding the application request for presence information to for example the XDMS 106.

Thus, in the process of FIG. 5, the implementation of the device 100 does not allow sharing of the GBA key material and B-TID between the VoLTE function 101 and RCS function 102. The BSF 103 can perform the GBA procedure with only one of the two HSSs (105/105') of the two IMS core networks, since they both relay/compute the same AV for the IMPU/IMPI pair. The computed Expected Response (XRES) should be the same for the same Random Challenge (RAND) and Authentication Token (AUTN) values. The HSS that performed the GBA will increment its SQN in alignment with the SQN value kept by the served function on the device (the other HSS would lag). Here, two FQDNs for the BSF 103 are used (implementation wise may be served by the same BSF node 103). In some embodiments, the VoLTE function 101 uses the VoLTE FQDN of the BSF 103, e.g., derived according to 3GPP TS 23.003, and the RCS function 102 uses the RCS FQDN of the BSF, which is configured, e.g., by the network operator. Thus, only one AP is needed, where this AP communicates with one BSF over the Zn interface.

In summary for the embodiments of a device implementation that does not allow the master GBA function in one of the IMS functions (hence a B-TID and its associated bootstrapping information cannot be shared among the IMS functions residing on the device), the following options are possible:

a. One IMS core (not illustrated in FIG. 5):
   i. The HSS/AuC supports separate SQN values for each IMPI, but allows sharing the same keys for AKA mechanisms. This translates into supporting different AVs for each IMPI (3GPP AV=[RAND, AUTN, XRES, CK, IK], where AUTN is a function taking as input the SQN).

b. Multiple IMS cores (illustrated in FIG. 5):
   i. The device and the network allow using different FQDN values for each served IMS core.
   Note: the same BSF instance may serve the multiple FQDN values and use the associated combination of the IP address/port (on which a request is received) to determine the HSS/AuC that serves that client. For example:
   1. VoLTE can use 3GPP TS 23.003 derived BSF Uniform Resource Identifier (URI); and
   2. For RCS, a different derivation scheme can be used, or a new configuration parameter for BSF needs to be added in the GSM Association (GSMA) specification(s). The lack of a configured BSF URI for RCS would implicitly default that the device must share the B-TID.

Figure 6:
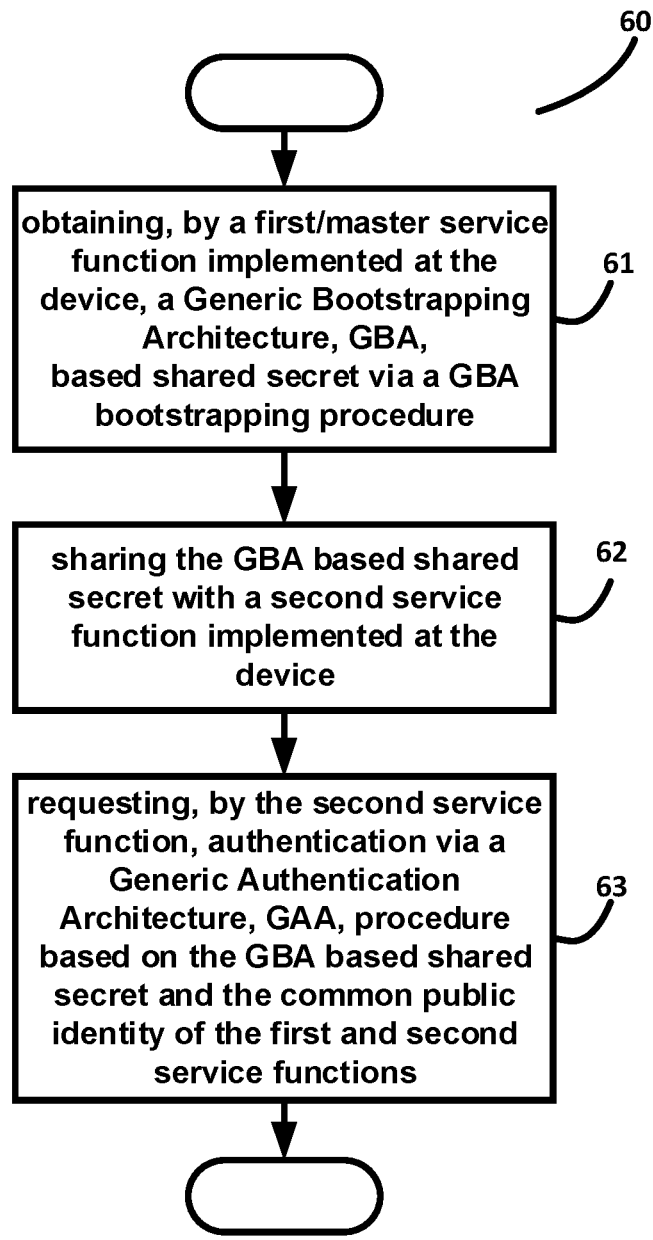
FIG. 6 illustrates a method of operation at a device implementing multiple Internet Protocol (IP) Multimedia Subsystem (IMS) service functions, namely in this example, a Voice over Long Term Evolution (LTE) (VoLTE) function and a Rich Communication Suite (RCS) function and where the service functions are able to share the GBA shared secret, according to some embodiments.

FIG. 6 illustrates a method 60 in a device or a user equipment, UE, when multiple service functions (e.g., IMS functions), which may be implemented in a single client or multiple clients, residing on the same device perform GBA/GAA authentication that is used further in the authentication procedures for any application protocols used from the device. The GBA based on AKA protocol provides the bootstrapping of application security to authenticate subscriber applications requests. In the embodiment of method 60, one service function/IMS function provides a GBA master function as it performs the GBA procedure and is able to share the received GBA shared secret, namely, B-TID, with the other service functions in the device. Two service functions VoLTE and RCS are used as examples. Either one of the VoLTE function or the RCS function can be the master GBA function and shares the B-TID with the other function. The VoLTE function and the RCS function share a common public identity, IMPU. In addition, if a single IMS core is used, the VoLTE and RCS function use different private identities, IMPIs. If the VoLTE function and RCS function use two IMS cores, they may use the same IMPIs.

At step 61, one function provides a master GBA function (e.g., the IMS function that should take on the master GBA function may be configured on the device), performs GBA procedures, and obtains a B-TID and associated material (e.g., lifetime, etc. . . . ) from the network (BSF). The master GBA function may also receive the NAF keys. The master GBA function may indicate that the NAF keys should be provided. The NAF keys may be included as the master GBA function is able to share the B-TID with the other service or IMS function. Alternatively, the device may generate the NAF keys. At step 62, the IMS function that provides the master GBA function (e.g., VoLTE function) shares the obtained B-TID and associated material (e.g., lifetime, etc.) with the other IMS function (e.g., RCS function) on the device. The master GBA function shares the information with the other IMS function via an internal interface when the IMS function is implemented in different clients (e.g., VoLTE client and separate RCS client) in the device or via internal signaling for example if the IMS functions (VoLTE and RCS) are implemented in the same client. At step 63, the other IMS function (e.g., RCS function) in the device use the shared and valid (not expired) B-TID it has obtained and the common public identity for its own authentication procedure with the Network Application Function (NAF) (e.g., an Aggregation Proxy for the XCAP case). Namely, if the other function is the RCS function and it needs to, e.g., obtain presence information, then, the RCS function communicates the B-TID obtained from the VoLTE function along with the public identity (IMPU) to an Application Proxy (AP) 104 over a Ua interface according to GAA. The IMPU is common to the RCS function and the VoLTE function.

Figure 7:
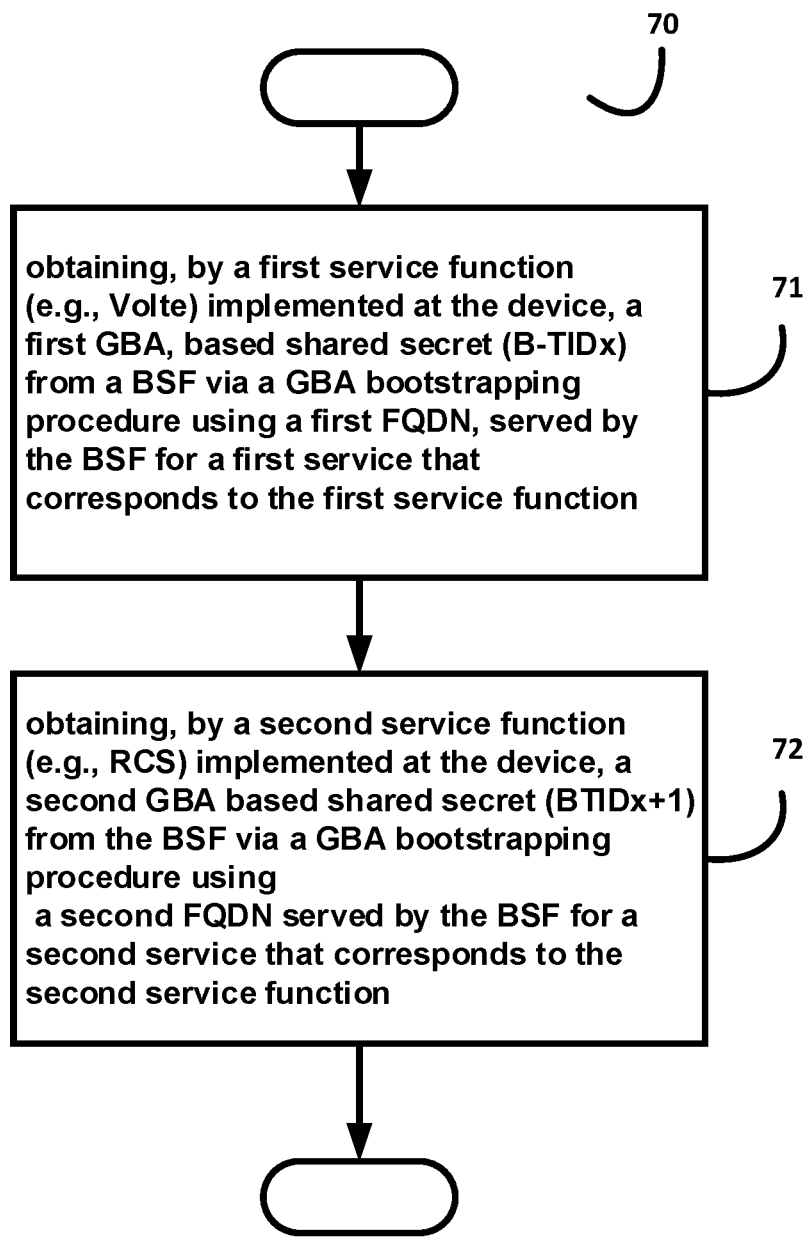
FIG. 7 illustrates a method of operation at a device implementing multiple Internet Protocol (IP) Multimedia Subsystem (IMS) service functions, namely in this example, a Voice over Long Term Evolution (LTE) (VoLTE) function and a Rich Communication Suite (RCS) function and where the service functions are not able to share the GBA shared secret, according to some embodiments.

FIG. 7 illustrates a method 70 in a device or a user equipment, UE, when multiple service functions (e.g., IMS functions), which may be implemented by multiple clients, residing on the same device perform GBA/GAA authentication that is used further in the authentication procedures for any application protocols used by the device. In the embodiment of method 70, the service functions do not share the received GBA shared secret, namely, B-TID, with the other service functions in the device. Hence unlike the embodiments described in FIG. 6, there is no master GBA function. Both functions perform GBA procedure. Two service functions VoLTE and RCS are used as examples. The VoLTE function and the RCS function share a common public identity, IMPU. In addition, if a single IMS core is used, the VoLTE and RCS function use different private identities, IMPIs. If the VoLTE function and RCS function use two IMS cores, they may use the same IMPIs. In the embodiment of FIG. 7, there is one BSF FQDN for VoLTE and one for RCS. The different FQDNs allow the BSF to determine to which IMS Core to connect in order to handle a bootstrapping request received from any one of the functions. In some embodiments, the VoLTE FQDN uses the FQDN for the BSF derived according to 3GPP Technical Specification (TS) 23.003, whereas the RCS FQDN is configured (e.g., by the network operator).

At step 71, the first service function, let's assume as an example, the first service function is the VoLTE function, performs GBA mechanism using IMPI, AKA parameters and the VoLTE FQDN (i.e., the interface with the BSF 103 using the VoLTE FQDN) and obtains the GBA based shared secret, B-TIDx and associated lifetime parameter from a BSF.

Similarly, at step 72, the second service function, namely the RCS function, performs a bootstrapping operation via GBA mechanisms using the RCS FQDN. In particular, the RCS function uses a Ub interface for RCS (i.e., the interface with the BSF using the RCS FQDN), which is referred to herein as the RCS Ub interface, IMPI, and the AKA mechanism as part of the GBA. The RCS function obtains another B-TID x+1 different from B-TIDx. Each function subsequently uses its own received B-TID when sending application requests for data (configuration or presence or other) over the Ua interface to the NAF.

Figure 8:
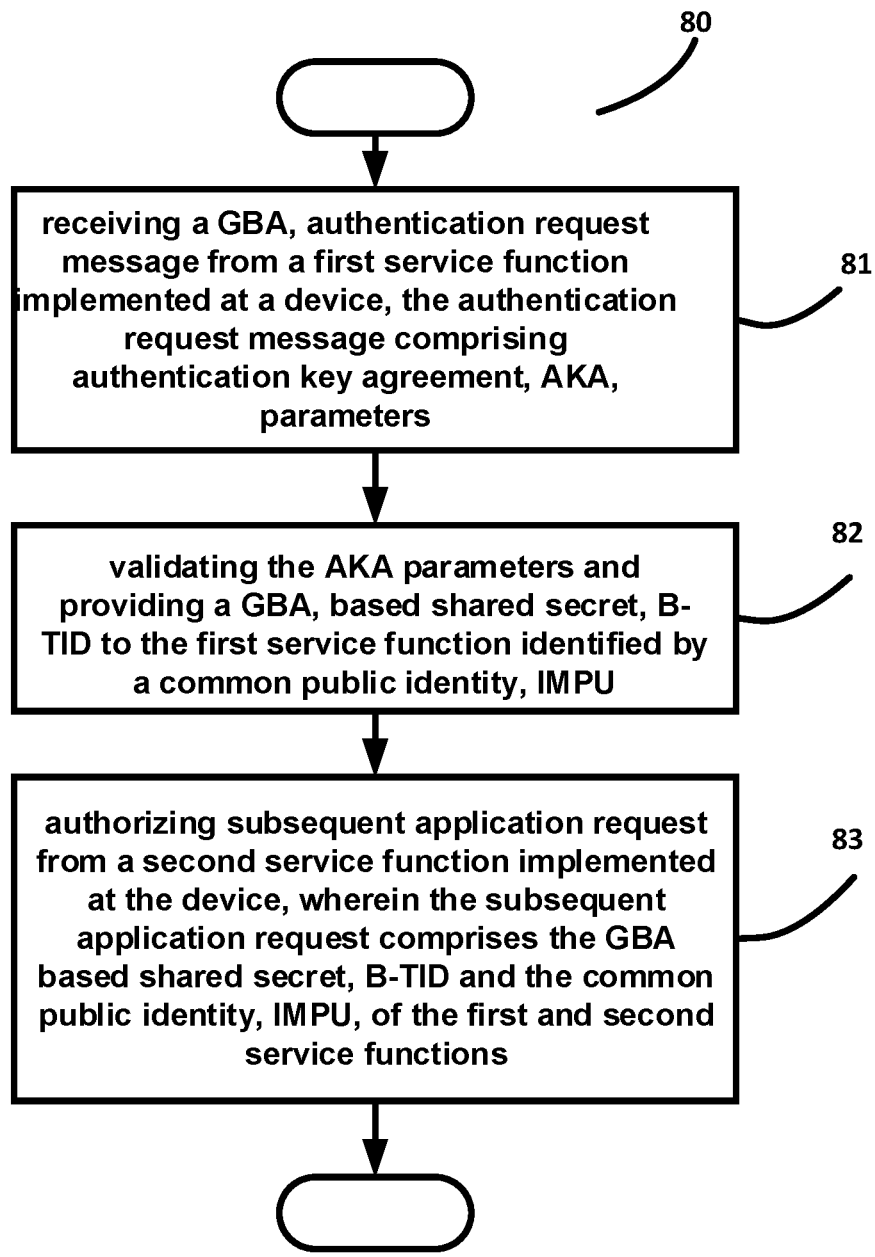
FIG. 8 illustrates a method of operation at a network node implementing BSF, according to some embodiments.

FIG. 8 illustrates a method 80 in a network node implementing the BSF. The BSF herein is based on the BSF described in 3GPP TS 33.320. The BSF is connected to the device/UE over the Ub interface and to the AP/NAF over the Zn interface. Additionally, the BSF may be connected to the HSS of one or more IMS cores. The embodiment in this Figure supports multiple service functions in a device that are capable of sharing the GBA shared secret.

At step 81, the BSF receives a, GBA, authentication request message from a first service function (e.g., VoLTE function) implemented at the device. The authentication request message comprises the AKA parameters and may include the IMPI or the IMPI was sent in a previous message prior to triggering the bootstrapping procedure;

At step 82, the BSF over the Zh interface, proceeds with validating the AKA parameters with the HSS in the IMS core. It may also obtain as part of the validation, the public identity of the first service function. Following validation of the AKA parameters, the BSF generates and provides a GBA, based shared secret (i.e., B-TID) and lifetime to the first service function. The BSF stored the GBA based shared secret, its lifetime and the public identity of the first service function. This information is used for future authorization of application requests from the same device.

At step 83, the BSF receives from the NAF a validation request for a second service function to validate the B-TID and the public identity (IMPU) that is common to the first and second service function. The NAF has triggered the validation request to the BSF after it has received an application request (e.g., a request to obtain presence data) from the second service function in the same device containing the B-TID provided to the first service function at step 82 and the common public identity (IMPU) it shares with the first service function. The BSF, at step 83 proceeds by verifying the B-TID and the public identity (B-TID not yet expired) and IMPU is in fact shared with the first service function, and authorizes the NAF to allow the service and to forward the application request from the device to the appropriate server for treatment. In some embodiments, there is dual registration with one IMS core, and the present disclosure describes the following example embodiments:

a. Method on the device to allow multiple clients or functions to use GBA/GAA with the same keys. One client is deemed to hold the Master GBA function, hence it performs the GBA bootstrapping and then shares the obtained B-TID with the other client. The clients on the device reuse the same B-TID throughout its lifetime (validity time).

b. Method in the network to allow multiple clients or functions on a device, servicing the same user (all clients use the same IMPU) to use GBA/GAA mechanisms when each client uses its own IMPI, by supporting same set of keys.

In some embodiments, there is dual registration with two IMS cores where the IMS functions at the device use the same IMPU/IMPI pair, and the present disclosure describes the following example embodiments:

a. Method on the device to allow multiple clients or functions to use GBA/GAA with the same keys. One client is deemed master and performs the GBA bootstrapping and then shares the obtained B-TID with the other client. The clients on the device reuse the same B-TID throughout its validity time. The BSF is connected to the HSS/AuC of the IMS core that serves the client that takes on the master GBA function.

b. Method in the network and the clients to support GBA with multiple IMS cores for different clients on the same device that use the same IMPU/IMPI pair, by using different BSF FQDNs.

Figure 9:
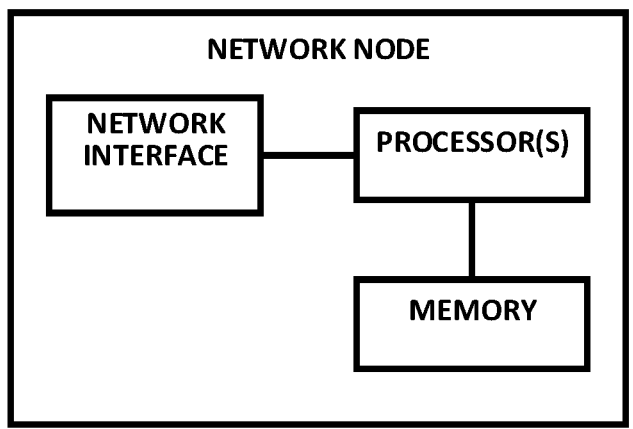
FIGS. 9 and 10 are block diagrams of some example embodiments of a network node.

FIG. 9 is a schematic block diagram of a network node (e.g., the BSF node or an AP node) according to some embodiments of the present disclosure. This discussion is equally applicable to other types of network nodes. As illustrated, the network node includes one or more processors (e.g., Central Processing Units (CPUs), Application Specific Integrated Circuits (ASICs), Field Programmable Gate Arrays (FPGAs), and/or the like), memory, and a network interface. In some embodiments, the functionality of the network node (e.g., BSF or AP) described above may be fully or partially implemented in software that is, e.g., stored in the memory and executed by the processor(s).

In some embodiments, a computer program including instructions which, when executed by at least one processor, causes the at least one processor to carry out the functionality of the network node (e.g., the BSF or AP) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 10:
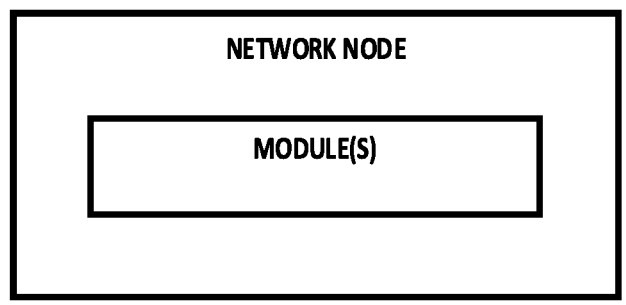

FIG. 10 is a schematic block diagram of the network node according to some other embodiments of the present disclosure. The network node includes one or more modules, each of which is implemented in software. The module(s) provide the functionality of the network node described herein.

Figure 11:
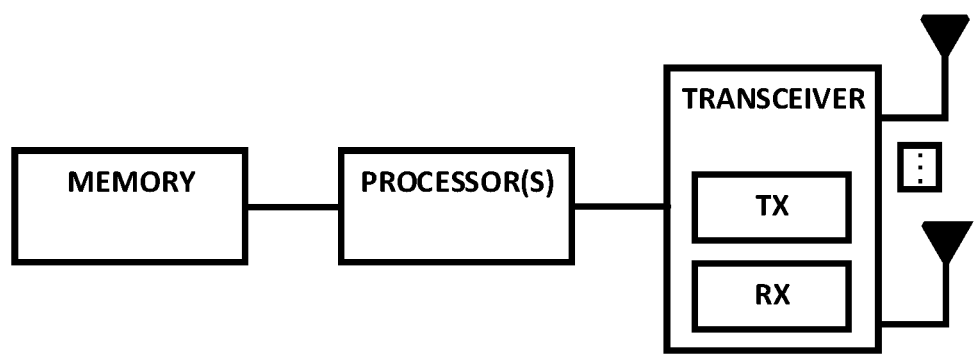
FIGS. 11 and 12 are block diagrams of some example embodiments of a device.

FIG. 11 is a schematic block diagram of the device, which in this example is a wireless device (e.g., a smart device such as a smart phone) according to some embodiments of the present disclosure. As illustrated, the device includes one or more processors (e.g., CPUs, ASICs, FPGAs, and/or the like), memory, and one or more transceivers each including one or more transmitters and one or more receivers coupled to one or more antennas. In some embodiments, the functionality of the device described above may be fully or partially implemented in software that is, e.g., stored in the memory and executed by the processor(s). In particular, the IMS service functions (e.g., the VoLTE function and the RCS function) are, at least in some embodiments, implemented in software (e.g., in the same or separate software clients) that are stored, e.g., in the memory and executed by the processor(s).

In some embodiments, a computer program including instructions which, when executed by at least one processor, causes the at least one processor to carry out the functionality of the device according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 12:
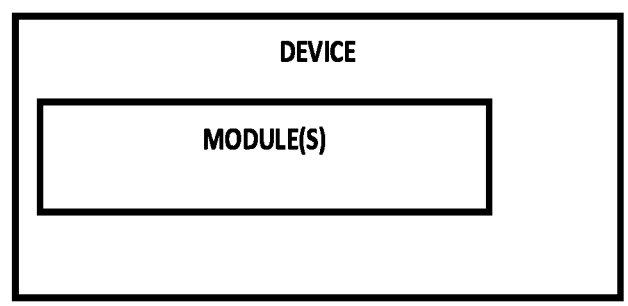

FIG. 12 is a schematic block diagram of the device according to some other embodiments of the present disclosure. The device includes one or more modules, each of which is implemented in software. The module(s) provide the functionality of the device described herein.

Those skilled in the art will recognize improvements and modifications to the embodiments of the present disclosure. All such improvements and modifications are considered within the scope of the concepts disclosed herein.

What is claimed:

1. A method of operation of a device implementing at least two different Internet Protocol, IP, Multimedia Subsystem, IMS service functions over an access network and sharing a common public identity, comprising:
   Obtaining over the access network, by a first IMS service function implemented at the device, a Generic Bootstrapping Architecture, GBA, based shared secret via a GBA bootstrapping procedure;
   sharing the GBA based shared secret with a second IMS service function implemented at the device; and
   sending, by the second IMS service function, an authentication request over the same access network using a Generic Authentication Architecture, GAA, procedure wherein the authentication request comprises the received GBA based shared secret for the first IMS service function and the common public identity identifying a user of the first and second IMS service functions.

2. The method of claim 1, wherein the GBA based shared secret comprises a Bootstrapping Transaction Identifier, B-TID.

3. The method of claim 2, wherein the GBA based shared secret further comprises associated bootstrapping information.

4. The method of claim 3, wherein the associated bootstrapping information comprises Network Application Function, NAF, keys.

5. The method of claim 1, wherein the first IMS service function is one of a Voice over Long Term Evolution, VoLTE, service and a Rich Communication Suite, RCS, service, and the second IMS service function is the other one of the VoLTE service and the RCS service.

6. The method of claim 1, wherein the common public identity of the first and second IMS service functions is an IP Multimedia Public Identity, IMPU.

7. The method of claim 1, wherein the first and second IMS service functions have different private identities.

8. The method of claim 6 wherein the first and second IMS service function are registered with the same IMS core.

9. The method of claim 1, wherein the first and second IMS service functions share a common private identity.

10. The method of claim 9 wherein the first and second IMS service functions are registered with separate IMS cores.

11. A method of operation of a network node implementing a Bootstrapping Server Function, BSF, the method comprising:
    receiving a Generic Bootstrapping Architecture, GBA, authentication request message from a first Internet Protocol, IP, Multimedia Subsystem, IMS service function implemented at a device, the authentication request message comprising authentication key agreement, AKA, parameters including a public identity identifying a user of the first IMS service function;
    validating the AKA parameters and providing a Generic Bootstrapping Architecture, GBA, based shared secret to the first IMS service function; and
    authorizing subsequent application request from a second IMS service function implemented at the device, wherein the subsequent application request comprises the GBA based shared secret previously provided to the first IMS service function and a public identity of the user of the second IMS service function that is common with the public identity provided by the first IMS service function.

12. The method of claim 11, wherein the GBA based shared secret further comprises a Network Application function, NAF, keys.

13. The method of claim 11, wherein the first IMS service function is one of a Voice over Long Term Evolution, VoLTE, service and a Rich Communication Suite, RCS, service, and the second IMS service function is the other one of the VoLTE service and the RCS service.

14. A device implementing at least two different Internet Protocol, IP, Multimedia Subsystem, IMS service functions over an access network and sharing a common public identity, the device comprising:
 one or more processors; and
 memory storing instructions executable by the one or more processors, whereby the device is operable to:
  obtain over the access network, by a first IMS service function implemented at the device, a Generic Bootstrapping Architecture, GBA, based shared secret via a GBA bootstrapping procedure;
  share the GBA based shared secret with a second IMS service function implemented at the device; and
  send, by the second IMS service function, an authentication request over the same access network using a Generic Authentication Architecture, GAA, procedure wherein the authentication request comprises the received GBA based shared secret for the first IMS service function and the common public identity that identifies the user of the first and the second IMS service functions.

15. A network node providing a Bootstrapping Server Function, BSF, the network node comprising:
 one or more processors; and
 memory storing instructions executable by the one or more processors, whereby the network node is operable to:
  receive a Generic Bootstrapping Architecture, GBA, authentication request message from a first Internet Protocol, IP, Multimedia Subsystem, IMS service function implemented at a device, the authentication request message comprising authentication key agreement, AKA, parameters including a public identity identifying a user of the first IMS service function;
  validate the AKA parameters and provide a Generic Bootstrapping Architecture, GBA, based shared secret and a corresponding GBA shared secret lifetime to the first IMS service function; and
  authorize subsequent application request from a second IMS service function implemented at the device, wherein the subsequent application request comprises the GBA based shared secret previously provided to the first IMS service function and a public identity of the user of the second IMS service function that is common with the public identity provided by the first IMS service function.

* * * * *